United States Patent [19]

Plant

[11] Patent Number: 4,805,355
[45] Date of Patent: Feb. 21, 1989

[54] INFLATABLE BUILDING STRUCTURE

[75] Inventor: David D. Plant, Toowoomba, Australia

[73] Assignee: Geraldton Waxflower Marketers Pty. Ltd., Queensland, Australia

[21] Appl. No.: 120,164

[22] Filed: Nov. 12, 1987

Related U.S. Application Data

[63] Continuation of Ser. No. 853,960, Apr. 21, 1986, abandoned.

[30] Foreign Application Priority Data

Apr. 24, 1985 [AU] Australia .............................. PH00297

[51] Int. Cl.⁴ .............................................. A01G 9/14
[52] U.S. Cl. ................................................ 52/1; 47/17; 52/2
[58] Field of Search .................... 52/122.1, 123.1, 745, 52/2, 1; 135/905, 105

[56] References Cited

U.S. PATENT DOCUMENTS

| | | | |
|---|---|---|---|
| 1,839,076 | 12/1931 | Adams | 135/105 |
| 2,440,557 | 4/1948 | Power | 135/105 |
| 3,113,403 | 12/1963 | MacMillan | 135/905 |
| 3,163,460 | 12/1964 | Cox | 135/102 |
| 3,175,857 | 3/1965 | Lewis | 135/102 |
| 3,328,926 | 7/1967 | Reinhard | 47/17 |
| 3,338,000 | 8/1967 | Ostrander | 52/2 |
| 3,626,836 | 12/1971 | Schneidler | 52/2 |
| 4,038,788 | 8/1977 | Claessens | 52/2 |
| 4,047,335 | 9/1977 | Darmstadt | 52/2 |
| 4,297,813 | 11/1981 | Farrell | 52/2 |
| 4,301,626 | 11/1981 | Davis | 52/2 |
| 4,590,719 | 5/1986 | McKibbin | 52/120 |
| 4,627,202 | 12/1986 | Esposito | 47/17 |
| 4,662,146 | 5/1987 | Parry | 52/745 |

FOREIGN PATENT DOCUMENTS

| | | | |
|---|---|---|---|
| 2431233 | 1/1975 | Fed. Rep. of Germany | 52/2 |
| 1550488 | 8/1979 | United Kingdom | 52/2 |

OTHER PUBLICATIONS

Pneumatic Structures by Herzog, published by Staples, London, 1976, TH 1099 H 4713, pp. 8, 9, 16, 17, 56, 57, 58, 59, 130, 131, 156, 157.

Primary Examiner—John E. Murtagh
Attorney, Agent, or Firm—Nixon & Vanderhye

[57] ABSTRACT

A process for erecting an inflatable building structure which is especially adapted for housing plants. The process includes the steps of (1) installing a plurality of support posts in the ground or other suitable base;
(2) attaching a roof structure formed from one or more inflatable membranes to the plurality of support posts; and
(3) inflating the inflatable membrane.

Preferably the inflatable membrane has peripheral rigid support members which are each attached to a row of associated posts. The roof structure formed from the inflatable membrane(s) together with rigid support members may be initially laid on the ground before being elevated. There also may be provided an upper securing cable extending across the top of the or each inflatable membrane which may initially be in a slack condition but which is subsequently tensioned before inflation. There also may be provided a lower support cable extending under the or each membrane which may initially be in a slack condition but which is subsequently tensioned before inflation. The invention also provides an inflatable building structure erected by the aforementioned process.

4 Claims, 10 Drawing Sheets

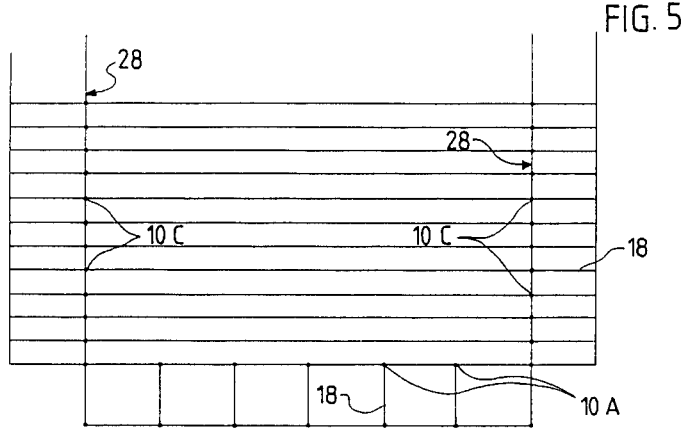
FIG. 5
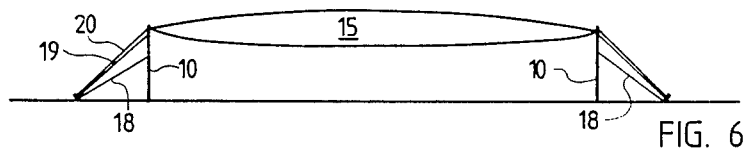
FIG. 6
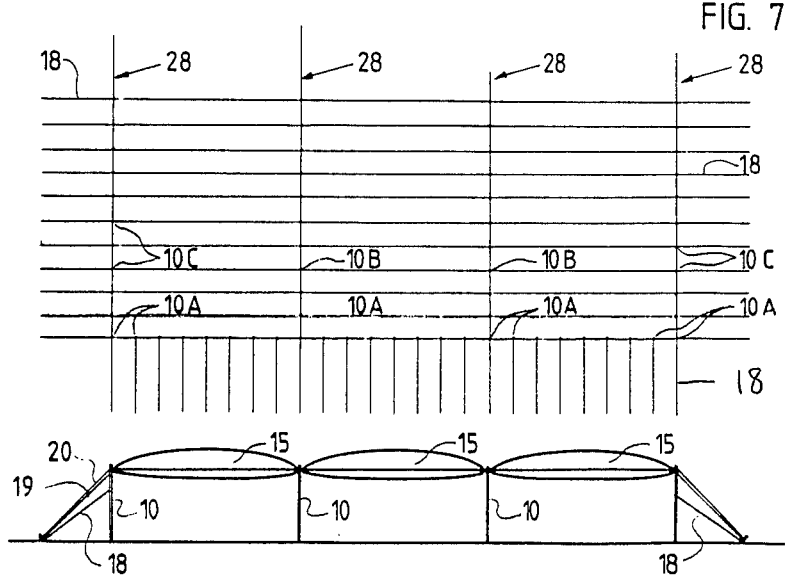
FIG. 7
FIG. 8

INFLATABLE BUILDING STRUCTURE

This is a continuation of application Ser. No. 853,960, filed Apr. 21, 1986, now abandoned.

This invention relates to an inflatable building structure comprising a plurality of support posts and an inflatable roof. The building structure is especially adapted for use as a greenhouse, fernhouse or building mainly utilized for the propagation of plants. However it will be appreciated that the building structure of the invention may be utilized for any other suitable purpose such as storage of perishable food articles.

Hitherto building structures for plants are usually time consuming to erect especially conventional greenhouses which are used for large scale commercial growing of plants which require abundant exposure to light and appropriate insulation so as to maintain a controlled temperature within the greenhouse. The greenhouse was usually constructed in accordance with standard building practice wherein a basic frame was first erected and then transparent panels usually formed from glass were attached thereto to form both the roof and walls of the greenhouse. The basic frame in requiring usually girders, beams and welding so as to interconnect adjacent frame members was expensive and time consuming in erection time. The addition of glass panels was also expensive and time consuming. However, because of the necessity to admit light normally in conventional greenhouses the roof could not be satisfactorily insulated and thus such greenhouses were prone to heat loss at night. Thus in order to maintain a controlled temperature it was usually necessary to utilize relatively expensive environment control equipment within the criterion of the greenhouses such as auxiliary heating systems. Thus it was also to be appreciated that conventional commercial greenhouses were relatively expensive to maintain. In order to avoid heat loss sometimes the glass panels were painted to convert them from being transparent to become translucent. However this was usually only a temporary solution and it was difficult to remove the paint from the glass panels.

It is an object of the invention to provide an inflatable building structure and process for erection of same which alleviates the abovementioned disadvantages of the prior art referred to above.

The process of the invention includes the following steps:

(a) installing a plurality of support posts in the ground or other suitable base;

(b) attaching a roof structure formed from one or more inflatable membranes to the plurality of support posts; and (c) inflating the roof structure.

Preferably the roof structure is formed from one or more roof membranes formed from transparent or at least translucent material wherein the roof membrane comprises an upper membrane usually in the form of a sheet and a lower membrane also usually in the form of a sheet which may be attached thereto along mutually adjacent side edges. In one form usually a suitable membrane may have a pair of opposed side edges wherein the side edges are each attached to each other or to a gutter member or other appropriate rigid member. When a plurality of membranes is being utilized the roof structure may comprise a pair of outer gutter members or rigid peripheral members and a number of membranes interposed therebetween with adjacent membranes being interconnected by intermediate gutter members or intermediate rigid members.

However it will be appreciated that the inflatable membrane may be in form of an inflatable bag or mattress or other suitable integral structure. The adoption of an upper membrane and lower membrane is convenient because each membrane may have mutually adjacent edges which are attached to each other before being attached to an associated gutter member or rigid member. In this arrangement usually each adjacent side edge of lower membrane and upper membrane is attached to each other in the form of a continuous bead which then may be retained in a suitable supporting groove or slot in the gutter member or rigid member. However, it will also be appreciated that the adjacent edges of both upper membrane and lower membrane may be separate from each other before attachment to the gutter member or rigid member. However the former arrangement is preferred.

The roof structure as discussed above in step (b) in a first embodiment may be placed or located in conjunction with the plurality of support posts such that the roof structure or roof structure component defined by a pair of gutter members or rigid members is initially laid on the ground between adjacent rows of support posts and hoisting cables are attached to the gutter members.

When the hoisting cables are elevated by appropriate means such as a winch hauling the cables upwardly over appropriate guide means such as pulleys located atop the support posts the roof structure or portion thereof which was initially in a slack or loose condition when laid on the ground may then assume a taut attitude. The gutter members or rigid members may then be mounted on or supported by mounting brackets attached on the support posts adjacent the pulleys. The pulleys and hoisting cables may then be removed and the roof membrane or membranes inflated by appropriate means. In one embodiment an inflating duct or pipe may communicate with the interior of the membrane and air may be pumped in by an air blower or fan.

There also may be utilized one or more support cables for the membranes when inflated and these support cables may extend between adjoining posts in such a manner that are orientated transversely to longitudinal rows of posts as illustrated hereinafter.

In step (a) usually the support posts may be arranged in a matrix of grid pattern when viewed in plan so that a plurality of rows of posts are arranged which extend longitudinally or lengthwise of the grid at spaced intervals which are substantially the same in each row. However, this is not essential and any suitable pattern may be utilized so as to be in conformity with method step (b) as described in detail above.

Usually the grid may be substantially rectangular although any other suitable grid shape is utilized. Suitably there are used corner posts, a plurality of peripheral posts located between a respective pair of corner posts with the remainder of the posts being interior posts.

The posts may have any suitable cross sectional shape such as being L shaped, substantially box section or may even be in the form of I beams. Preferably however each post may be channel shaped or substantially box section depending upon its location.

The gutter members may be of any suitable shape such as being channel shaped. The gutter members after step (b) may be held fast or secured appropriately to the top of the posts by being bolted to the aforementioned mounting brackets. There also may be applied gutter members along the periphery of the grid if desired.

The support posts may be stayed or braced. Preferably brace members extend between adjacent peripheral or interior posts. The brace members may extend diagonally between adjacent posts. The peripheral posts may be stayed as well as braced and thus stays may extend downwardly from the top of each peripheral post and have an end anchored to the ground. Both brace members and stays may be formed by rigid frame members or rigid cables which may be tensioned.

The inflatable building structure of the invention may also include appropriate peripheral closure members which may be in the form of curtain members. Thus there may be provided curtain members at both sides of the building structure and at each end thereof which may be selectively raised or lowered so as to control the interior temperature of the building structure. Any appropriate control means to effect raising or lowering of the side curtain members may be utilized such as a winch actuated by suitable gearing means.

In a variation on the foregoing it will also be appreciated that only the side or end curtain members are selectively lowered or raised with the remainder of the curtain members being fixed or rigid installations.

The control means for effecting raising or lowering of the curtain members may also be thermostatically actuated. In this embodiment a thermostat located inside the building structure may be set at an optimum interior temperature. If the actual temperature exceeds or drops below the optimum interior temperature the thermostat may be electrically connected to the electric motor of the winch so as to reverse the polarity thereof which will cause upward or downward movement of the curtains as the case may be so as to change the interior temperature to the optimum value.

In a second embodiment of the invention there may be utilized an erection process using a rectangular array of posts so as to define two opposed rows of end support posts and two opposed rows of side support posts. The end posts may be installed in an upright orientation in the ground and the side posts may be left lying on the ground. An integral assembly of roof membrane(s) optionally together with side curtains may then be attached to the tops of the side posts. In this arrangement there may be provided rigid peripheral members of the roof assembly which are clipped onto or otherwise attached to the tops of the side posts.

Suitably the side posts are hingedly attached to an appropriate base structure and there also is a winch cable support member releasably attached to the side posts. The arrangement is such that the side posts may be winched upwardly so as to be oriented vertically with the roof membrane(s) attached thereto. The winch cable support member may then be removed from the side posts which are then secured into position by securing cables. The end posts may also have end curtain members attached thereto so as to finalize installation of the greenhouse structure in this second embodiment.

Reference may now be made to a preferred embodiment of the invention as shown in the attached drawings wherein:

FIGS. 5-6 are plan and front views of a one type of inflatable building structure constructed in accordance with the first embodiment of the invention;

FIGS. 7-8 are plan and front views of another type of inflatable building structure constructed in accordance with the first embodiment of the invention;

FIG. 10A is a detailed view of the attachment structure attaching the roof membrane to the gutter member;

In FIGS. 1-4 the process of the invention is illustrated in relation to the erection or installation procedure of the building structure of the invention.

Figure 1:
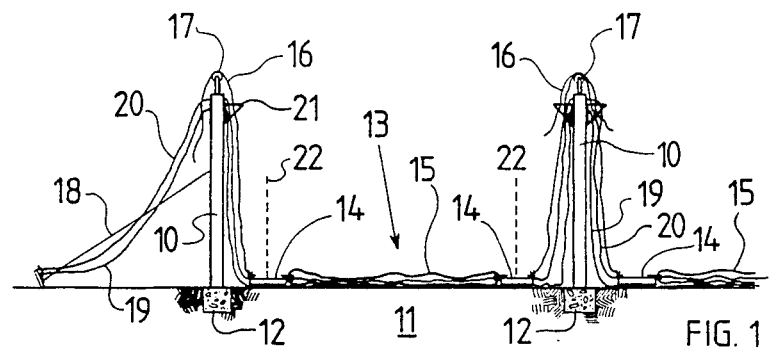
FIGS. 1-4 are schematic illustrations of a first embodiment of the process of the invention.

Support posts 10 are first embedded in the ground 11 by appropriate means such as being embedded in a concrete block 12. A roof component 13 comprising a pair of opposed gutter members 14 and a roof inflatable membrane 15 interposed between each gutter member 14 is laid on the ground 11 between a pair of support posts 10. Hoisting cables 16 are attached to each gutter member 14 and are attached to pulleys 17 located on the top of support posts 10. Support posts 10 are also braced by stays 18. There is also shown support cables 19 and 20 for roof components 13 which initially as shown in FIG. 1 are in a slack attitude.

Figure 2:
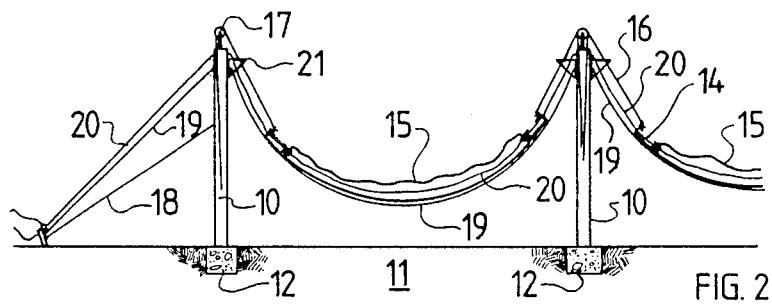
Figure 3:
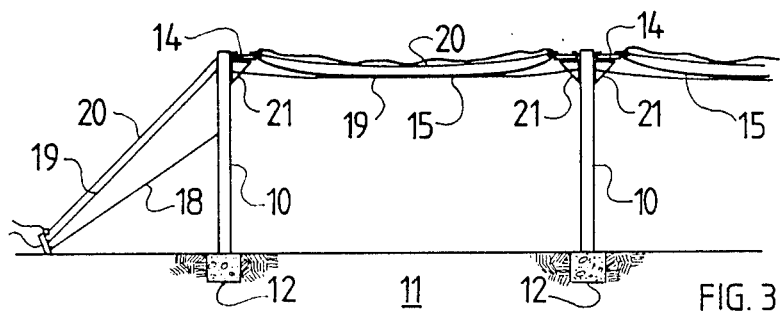

Upon actuation of a winch (not shown) hoisting cables 16 may be pulled through pulleys 17 and thus elevate roof components 13 as shown in FIG. 2 until gutter members 14 are mounted on mounting brackets 21. Cables 19 and 20 may also be tensioned by appropriate tensioning means such as a turnbuckle or the like (not shown) until they assume a taut attitude as shown in FIGS. 2-3. Lift chains 22 may also be used to elevate gutter members 14 to be mounted on mounting brackets 21. Lift chains 22 may be elevated by a crane (not shown) or other suitable elevating means.

Figure 4:
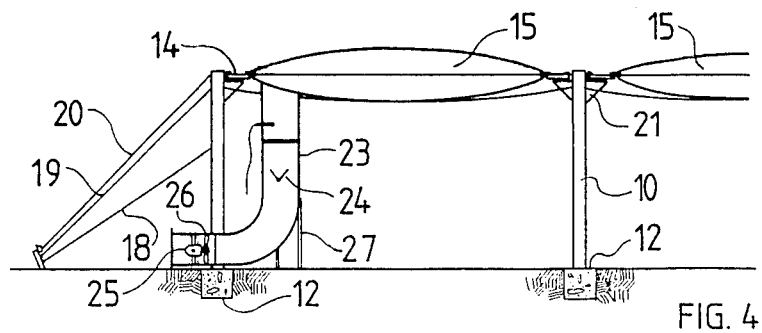

Once gutter members 14 are supported by mounting brackets 21 they then may be inflated as shown in FIG. 4 by appropriate means such as an inflating pipe 23 which may communicate with the interior of membrane 15. Inflating pipe 23 may have a control butterfly valve 24 and motor 25 driving impeller 26. Inflating pipe 23 may be supported by suitable supports 27.

In FIGS. 5-8 the arrangement of posts 10 is illustrated. In the embodiment of FIGS. 5-6 only one membrane 15 is utilized between longitudinal rows 28 of support posts 10. In the embodiment of FIGS. 7-8 a plurality (ie. three) membranes are utilized wherein each membrane 15 is located between the series of longitudinal rows 28. Also shown are end peripheral posts 10A located in one end or front of the building structure and clearly the spacing between internal posts 10B is very much greater than between end peripheral posts 10A.

Peripheral posts 10A are also braced by stays 18 as is the case with side peripheral posts 10C.

Figure 9:
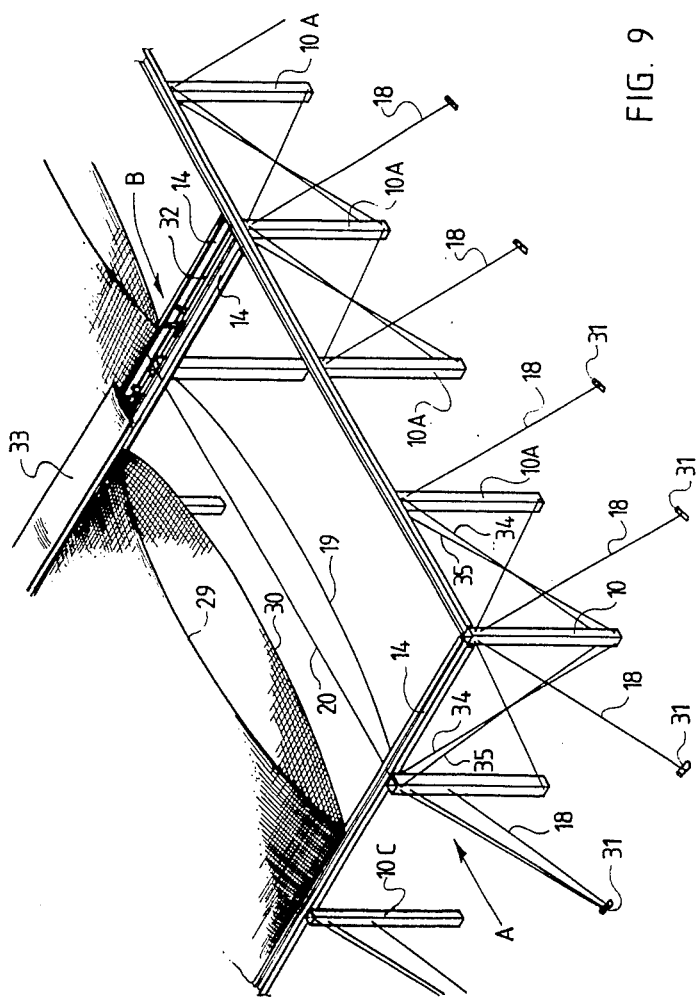
FIG. 9 is a corner perspective view of the building structure shown in FIGS. 5-6.

In FIG. 9 there is shown membrane 15 which may comprise an upper membrane 29 and lower membrane 30. The side edges of upper membrane 29 and lower membrane 30 may be attached to gutter members 14 and between adjacent gutter members 14 of mutually adjoining membranes there may be provided a gap 32 covered by cover member 33. Between adjacent end peripheral posts 10A there may be provided diagonally oriented braces 34 and 36 as shown as well as between corner posts 10 and side peripheral post 10C. There is also shown ground supports 31 in the form of spikes or pegs to which are attached stays 18 as well as support cables 19 and 20.

Figure 10:
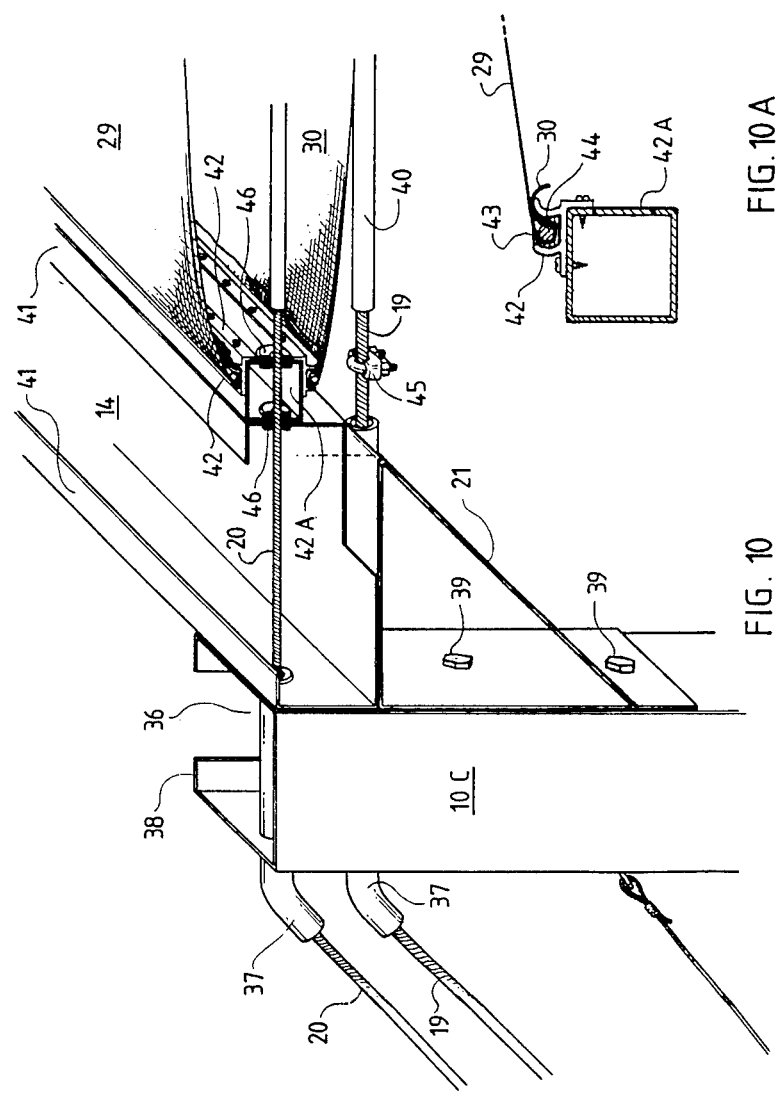
FIG. 10 is a detailed perspective view illustrating the structure as indicated by arrow A in FIG. 9.

In FIG. 10 there is shown rigid pipes 37 for cables 19 and 20 which enable cables 19 and 20 to have a relatively gentle curve or radius before assuming a horizontal orientation as shown. Support post 10C is of substantially channel cross sectional shape having slot 36 and return flanges 38. Brackets 21 are bolted to support post 10C by bolts 39. Upon assuming a horizontal orientation cables 19 and 20 may have plastics sleeves 40. Gutter 14 may have return flanges 41. As shown gutters 14 are supported by brackets 21. There is also provided extrusion members 42 of substantially U-shaped cross-section which include a slot or groove 43 for retention of a continuous bead 44 which secures the curtain membrane forming upper membrane 29 and lower membrane 30 in place. Bead 44 may secure mutually adjacent side edges of membranes 29 or 30 or alternatively a common strip of membranes 29 or 30 in place in slot 43. A detailed view of this arrangement is shown in FIG. 10A. Also shown is extrusion support member 42A of substantially rectangular cross section. Also shown is cable clamp 45 and grommet 46.

Figure 11:
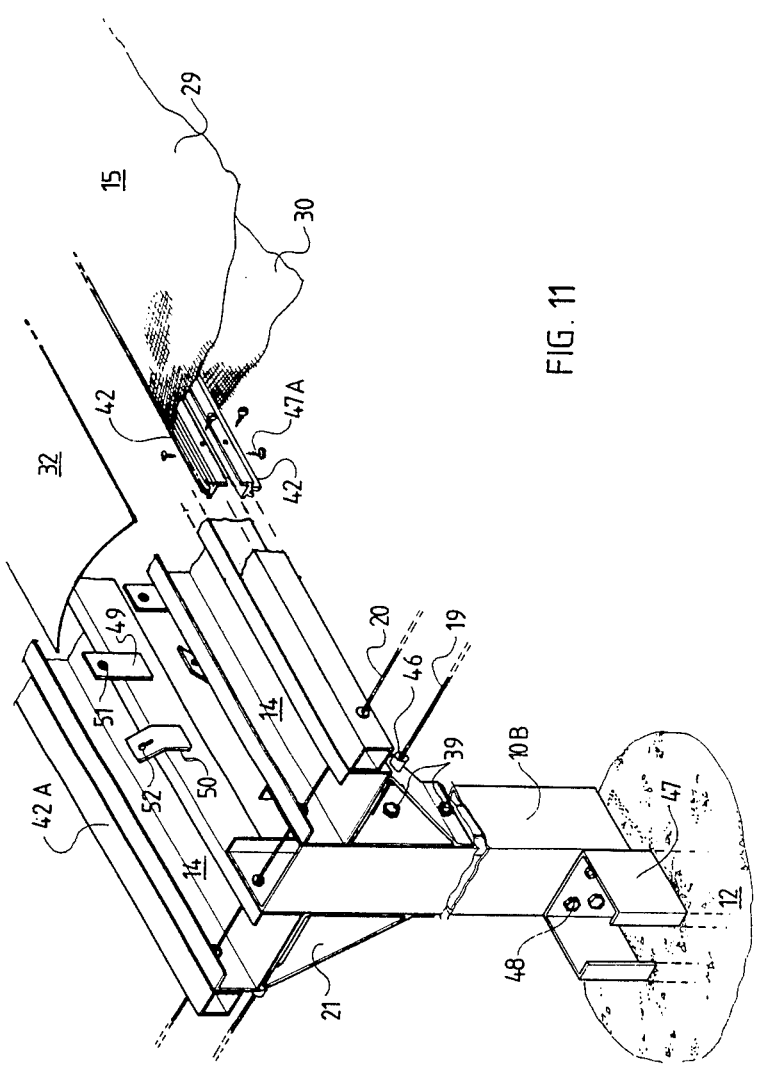
FIG. 11 is a similar view to FIG. 10 showing the structure indicated by arrow B in FIG. 9.
Figure 12:
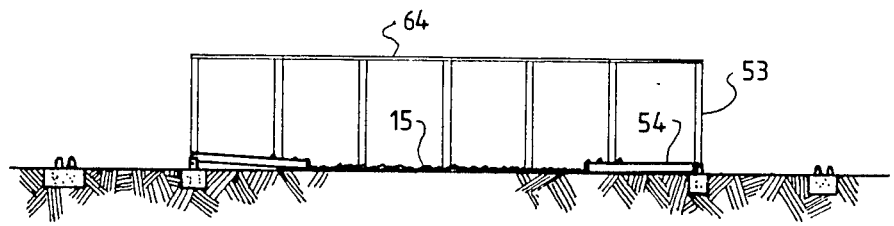
FIGS. 12-17 are schematic illustrations of the second embodiment of the invention showing the installation process.

In FIG. 11 there is shown internal post 10B having fixed mounting 47 to footing 12 and bolts 48 attaching mounting 47 to post 10B. Also shown are tabs 49 and 50 attached to gutter members 14. Tabs 49 together with associated apertures 51 are used as attachment locations for pulleys 17 discussed earlier. Tabs 50 together with associated apertures 52 are used for attachment locations for chains 22 discussed earlier.

Figure 17:
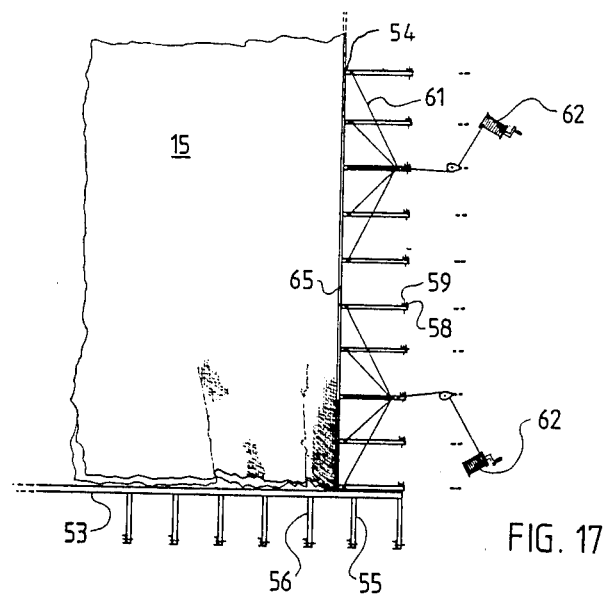
Figure 18:
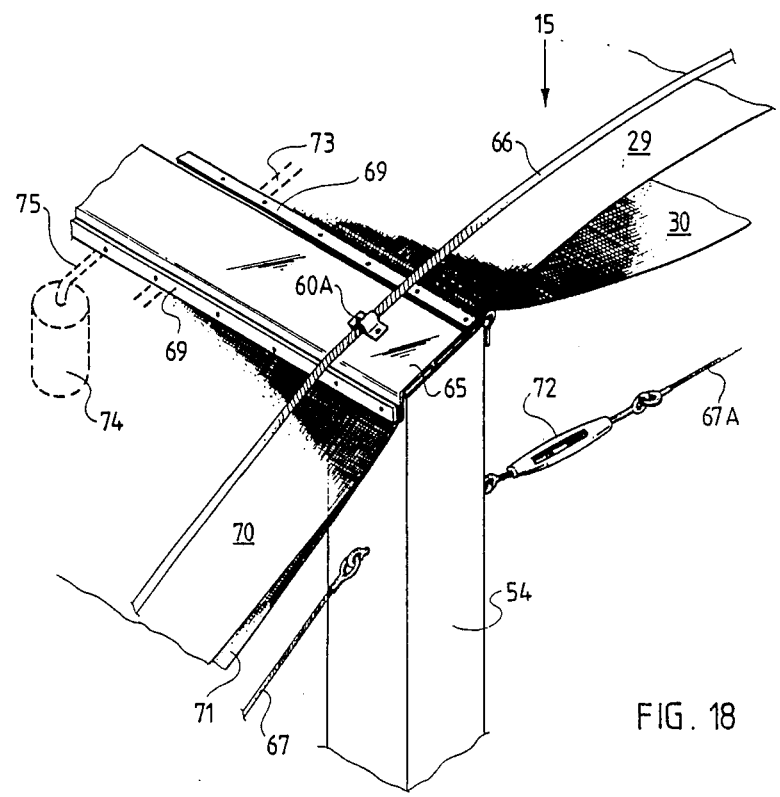
FIG. 18 is a side perspective view of an inflatable building structure constructed in accordance with the second embodiment of the invention.

In the process of the second embodiment of the invention as shown in FIGS. 12-17 initially a rectangular array of posts is formed with two opposed rows of end posts 53 supported in the ground and two adjacent rows of side posts 54 lying on the ground with their tops lying inwardly as shown in FIG. 17. End posts 53 are supported by cables 55 and 56 which are attached to anchor structure 57 as shown in more detail in FIG. 22.

Side posts 54 are hingedly attached by pivot bolts 59 to a metal plate anchor 58. They also have attached thereto temporary supports 60 acting as a compression column. Supports 60 have cables 61 all attached to winch 62. Also shown is anchor pulley 63. End posts 53 are first erected and attached together by continuous top plate 64. Roof membrane 15 has attached thereto on each side thereof a continuous rigid member 65 in the form of an extrusion which may be clipped to the tops of posts 54 and attached thereto by screws (not shown).

Figure 13:
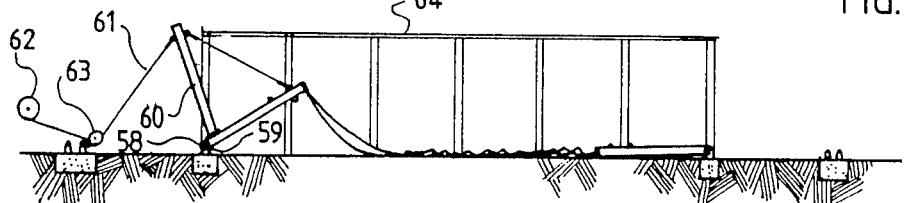
Figure 14:
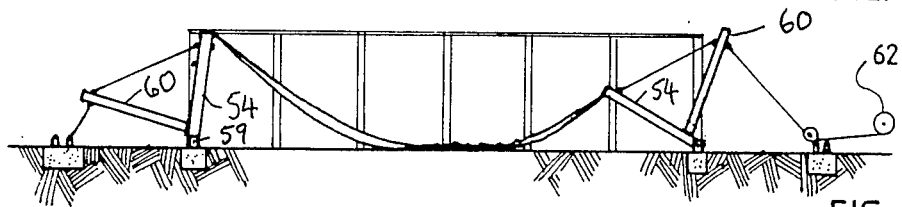
Figure 15:
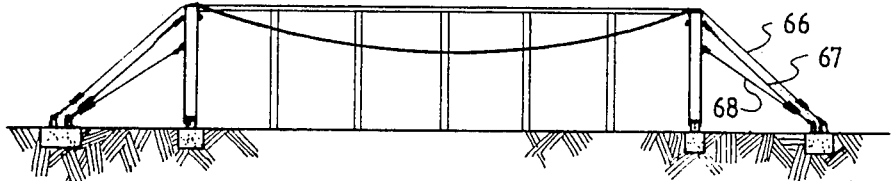
Figure 16:
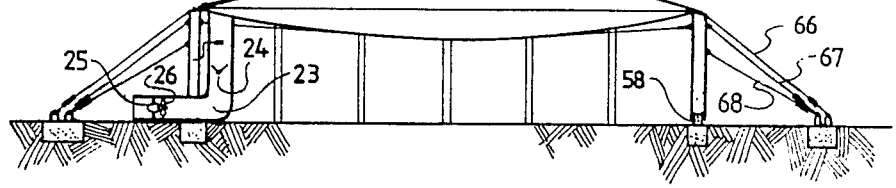

In the process shown in FIGS. 12-17 the side posts 54 have attached thereto temporary support member 60 and cables 61 which passes in bearing contact over the top of member 60 and held thereto by a U bolt 60A. Upon actuation of winch 62 posts 54 are raised upwardly as shown in FIGS 13-14 with posts 54 pivoting on pivot bolts 59. As soon as one row of posts 54 reach a near vertical orientation as shown in the left hand side of FIG. 14 they are retained in this position temporarily while the other side (ie. the right hand side in FIG. 14) of posts 54 are elevated in similar manner to a vertical position and retained in this position by securing cables 66 and 67. Thereafter the left hand side posts are raised to their full height and also secured in position by support cables 66 and 67. One cable 66 functions as an upper retaining cable or hold-down cable while the other cable 67 functions as a bottom support cable for roof membrane 15. Post 54 may also be retained in position by braces 68. Subsequently posts 54 may be secured by tightening of bolts 59 in anchor 58. The roof membrane 15 may then be fixed to end plates 64.

Thereafter roof membrane 15 may be inflated in similar manner as already described above in FIG. 4.

FIGS. 18-22 describes the inflatable building structure formed by the process shown in FIGS. 12-17. Thus there is shown upper and lower membranes 29 and 30 of roof 15 which are each clamped to extrusion 65 by clamping strap 69. Also shown are side curtains 70 and 71 with the bottom curtain 71 functioning as a insect screen. Bottom support cables 67 and 67A are also shown as well as turnbuckle tensioner device 72. Also shown is duct 73 interconnecting the interior of membrane 15 and the interior between curtains 70 and 71. Thus when membrane 15 is inflated the interior of side curtains 70 and 71 may also be inflated if required. However, it will be appreciated that the interior of side curtain 70-71 may be inflated separately if desired. Also shown is pump 74 which may communicate with the interior of membrane 15 to inflate same if required through conduit 75. A non return valve (not shown) may be associated with the interior of membrane 15 or curtains 70-71 also if required.

Figure 19:
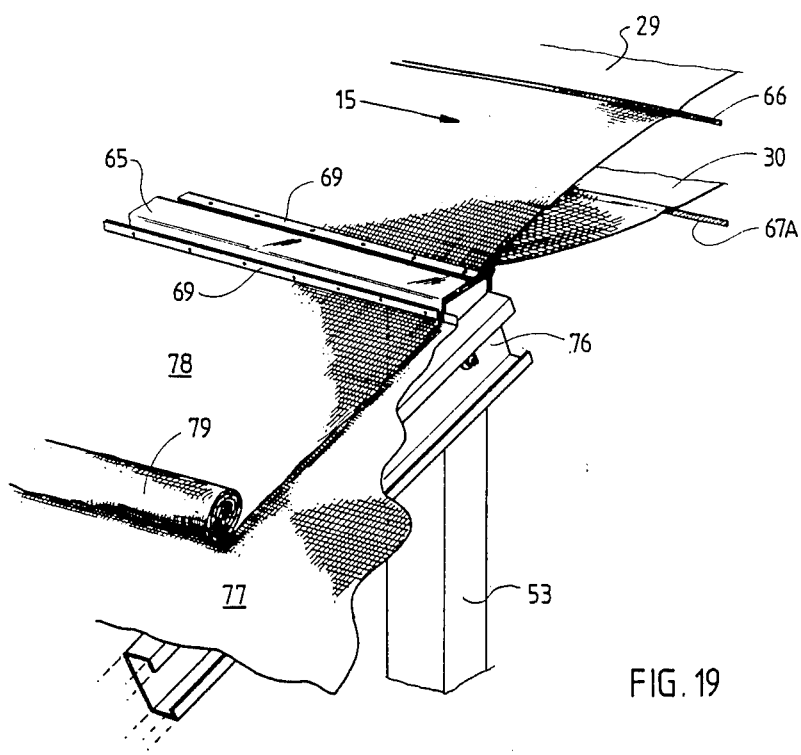
FIG. 19 is an end perspective view of the structure shown in FIG. 18.
Figure 20:
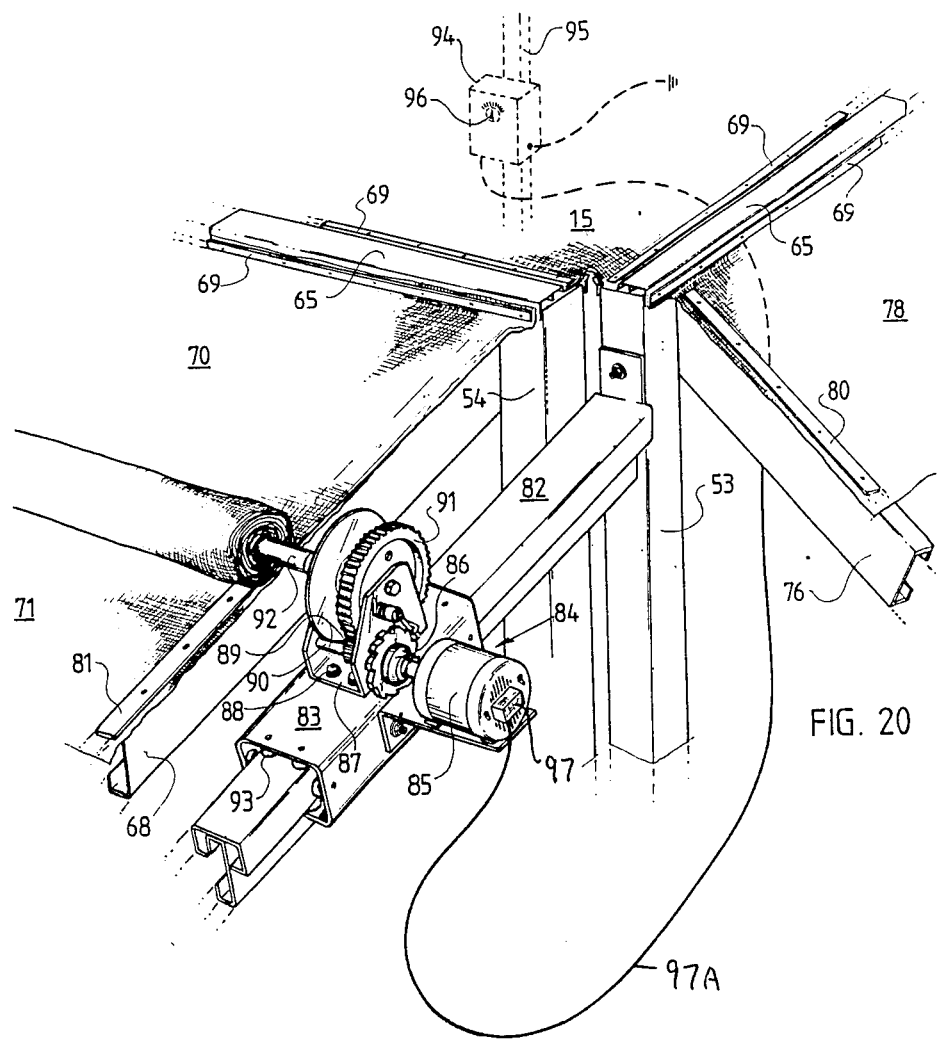
FIG. 20 is a corner perspective view of the structure shown in FIG. 18.

In FIG. 19 there is shown end post 43, bracing girder 76 and end curtains 77 and 78 with bottom end curtain 77 functioning as an insect screen if desired. Top curtain 78 may be rolled up if desired as shown at 79. This may be done mechanically as shown hereinafter in FIG. 20 or thermostatically as also shown in FIG. 20. If desired a conduit (not shown) may communicate between the interior of membrane 15 and the interior of end curtains 77 and 78 as described in FIG. 18 in regard to duct 73. Suitably the pressure maintained within the interior of membrane 15 is between 26-32 pascals.

In FIG. 20 there is shown the actuating mechanism for effecting raising or lowering of side curtain 70. End curtain 78 may be attached to girder 76 by clamping strap 80. Clamping strap 81 may also attach bottom side curtain 77 to girder 68. There is also provided support rail 82 for carriage 83 for motor assembly 84. Motor assembly 84 includes motor 85, clutch 86, carrier bracket 87 attached to carriage 83 by bolts 88. Pinion 89 attached to output shaft 90 meshes with larger gear wheel 91 and rotates same and therefore mandrel 92 is also rotated. Carriage 83 upon actuation of motor 85 moves up and down on carrier rail 82 and to this end has internal roller bearings 93. There is also shown thermostat control 94 attached to support 95 having a rotary control knob 96. Power cable 97A interconnects thermostat 94 to motor 85 as shown. The mechanism as shown in FIG. 20 operates upon actuation of motor 85 by thermostat 94 through solenoid 97. When the motor is not in operation the carriage 83 is braked by clutch 86. When motor 85 cuts in solenoid 97 disengages clutch 86 and the operation of motor 85 enables carriage 83 to move upwardly or downwardly on carrier rail 82 depending upon the polarity of the power supply.

Figure 21:
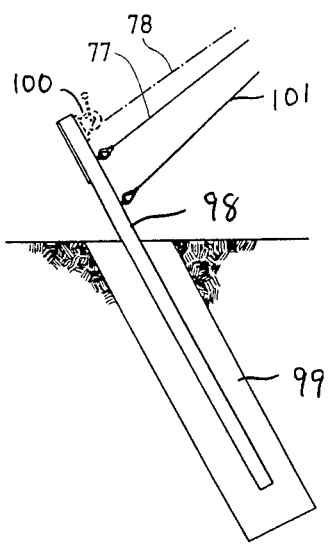
FIG. 21 is a detailed view of the anchor post used for supporting the end curtain members in FIG. 19.
Figure 22:
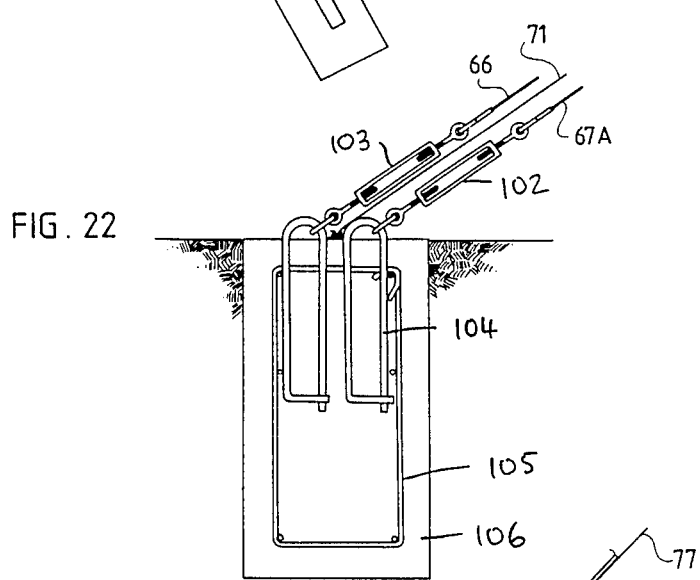
FIG. 22 is a detailed view of the anchor structure used for supporting the support cables shown in FIG. 18.

In FIGS. 21–22 there is shown appropriate anchor structure for both the end curtains 77 and 78 and cables 66 and 67a. Thus in FIG. 21 there is shown anchor post 98 embedded in concrete 99 which optionally comprises a steel RSJ member. There is also shown a curtain winch 100 for elevating or lowering end curtain 78. Also shown is lower end curtain 77. There is also shown support cable 101.

In FIG. 22 cables 66 and 67A are shown as well as fixed side curtain 71. Also shown are turnbuckles 102 and 103 for tensioning cables 66 and 67A when required. Also shown are galvanized steel stirrups 104, steel reinforcement frame 105 and concrete 106.

Figure 23:
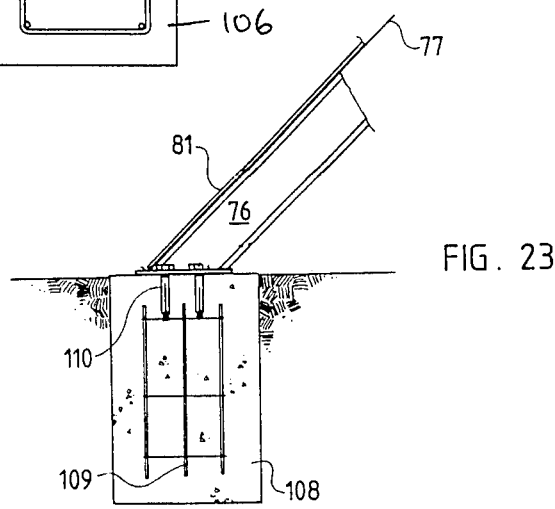
FIG. 23 is a detailed view of the anchor structure for the corner bracing of the structure shown in FIG. 18.

In FIG. 23 there is shown girder 76, fixed curtain 77, clamping 81, concrete 108 and steel reinforcement frame 109 and bolts 110.

The inflatable building structure of the invention is very advantageous in use in that the structure is very readily and efficiently installed or erected in comparison with the prior art and also in view of the standard components that may be utilized and is very cost effective. The use of the inflatable membrane 15 provides a controlled gutter situation where the membrane 15 in effect functions as a very efficient gutter in case of heavy rainfall and still allows natural light to have access to the greenhouse interior. The use of the side curtains and end curtains provides a controlled temperature situation especially where the side curtains and/or end curtains may be selectively raised or lowered as required.

I claim:

1. An inflatable building structure erectable in situ for housing plants comprising:
    a plurality of vertically oriented support posts arranged in two or more spaced parallel rows thereof, the outer rows of which define opposite sides of the building structure;
    a roof structure formed from one or more inflatable membranes attached to and standing between two spaced parallel rows of support posts and constituting the roof of the building structure;
    elevating means including cables connected to the tops of the posts of said two rows thereof for raising said one or more inflatable membranes in an uninflated condition to a position supported on the tops of said posts and providing upper and lower support cables for roof members when inflated;
    one or more side curtains associated with the outer rows of said support posts and extending substantially from the top of the posts to adjacent ground level;
    actuating means for selectively raising or lowering the lower end of said one or more side curtains;
    thermostat control means for operating said actuating means to raise or lower the bottom end of said one or more curtains in response to temperature variations from a selected temperature in order to maintain the temperature of the interior of the building structure at the selected temperature;
    said actuating means including a support rail attached to an adjacent vertically oriented support post;
    a carriage member for reciprocatable movement along the support rail;
    a support rod for supporting at least one of said side curtains in the course of its raising and lowering movement;
    a motor assembly mounted in the support rail; and
    gear means interconnecting the motor assembly and said support rod for said one side curtain.

2. An inflatable building structure according to claim 1 including a solenoid interposed between the motor assembly and the thermostat control means to enable the motor assembly to drive the carriage member along the support rail.

3. An inflatable building structure erectable in situ for housing plants comprising:
    two or more spaced parallel rows of support posts initially arranged to form a grid, the two outermost rows of posts being erectable from a horizontal to a vertical position, elevating means connected to the tops of said posts and extending across said rows of posts and outwardly of the outermost rows of posts;
    one or more roof members, each formed of an inflatable membrane, and initially disposed on the ground in an uninflated condition between the horizontally disposed posts;
    said elevating means including cables connected to said one or more inflatable members;
    means for tensioning said cables and raising the outermost posts from their initially horizontal positions to their vertical positions for supporting said roof members on the tops of said posts;
    said cables of said elevating means extending across the tops of said posts when erected and providing upper and lower support cables for said roof members when said members are inflated;
    one or more side curtains supported on the outermost support posts and extending substantially from the tops of said posts to adjacent ground level;
    actuating means for selectively raising and lowering the lower end of one or more of said side curtains;
    thermostat controlled means for operating said actuating means to raise or lower the bottom end of one or more of said side curtains in response to variations from a selected temperature in order to maintain the temperature inside the structure at the selected temperature;
    said actuating means including a support rail attached to an adjacent vertically oriented support post; and
    a carriage member mounted for reciprocal movement along said support rail.

4. An inflatable building structure according to claim 3, including a support rod for supporting at least one of said side curtains during raising and lowering movement, a motor assembly mounted on said support rail and gear means interconnecting the motor assembly and said support rod for said one side curtain.

* * * * *